United States Patent

Harada et al.

[11] Patent Number: 6,126,716
[45] Date of Patent: Oct. 3, 2000

[54] IRON-BASE SCRAP PREHEATING APPARATUS AND METHOD

[75] Inventors: Toshiya Harada; Yukinori Shigeyama; Mitsugu Takeuchi, all of Futtsu, Japan

[73] Assignee: Nippon Steel Corporation, Tokyo, Japan

[21] Appl. No.: 09/117,714
[22] PCT Filed: Feb. 13, 1997
[86] PCT No.: PCT/JP97/00383
  § 371 Date: Dec. 28, 1998
  § 102(e) Date: Dec. 28, 1998
[87] PCT Pub. No.: WO97/30320
  PCT Pub. Date: Aug. 21, 1997

[30] Foreign Application Priority Data

Feb. 13, 1996 [JP] Japan ..................... 8-48410

[51] Int. Cl.⁷ .................................. C22B 1/00
[52] U.S. Cl. .................... 75/401; 75/414; 75/574; 75/581; 266/142; 266/145; 266/156; 266/197; 266/901
[58] Field of Search ................... 266/901, 156, 266/197, 145, 173, 142; 432/72; 75/481, 414, 574, 581

[56] References Cited

U.S. PATENT DOCUMENTS

| 4,852,858 | 8/1989 | Weber | 266/175 |
|---|---|---|---|
| 5,889,810 | 3/1999 | Katayama et al. | 373/80 |

FOREIGN PATENT DOCUMENTS

| 291701 | 11/1988 | European Pat. Off. . |
| 2328046 | 5/1977 | France . |
| B-6-46145 | 6/1994 | Japan . |
| 6-228662 | 8/1994 | Japan . |
| 7-180975 | 7/1995 | Japan . |
| 8-21691 | 1/1996 | Japan . |
| 8-271164 | 10/1996 | Japan . |
| 8-285475 | 11/1996 | Japan . |
| WO9424506 | 10/1994 | WIPO . |
| WO9630709 | 10/1996 | WIPO . |

OTHER PUBLICATIONS

Liuyi Zhang and Franz Oeters, "Simulationsmodell zur berechnung der schrottvorwarmung mit gestufter nachverbrennung", *Stahl and Eisen,* vol. 110, No. 5, May 15, 1995, pp. 75–82, XP000511498, *p. 80–p. 81*.

Database WPI, Week 97530 May 1997 *Derwent Publication Ltd.,* London, GB; AN 9713640, XP00208786 & JP 09 014865 A (NKK Corp.), Jan., 17, 1997.

"Strategy of Electric Furnace in Common Steel", Nov. 1994 p 59.

"Scrap Melting Process of Converter Type", vol. 78, No. 4, *Journal of the Iron and Steel Institute of Japan,* pp 520–526 Apr. 1992.

*Primary Examiner*—Jill Warden
*Assistant Examiner*—Tima McGuthry-Banks
*Attorney, Agent, or Firm*—Kenyon & Kenyon

[57] ABSTRACT

In order to preheat pieces of iron scrap of various sizes and shapes highly effectively while avoiding the fusion of the pieces of iron scrap, a rotary kiln type preheating furnace and a shaft type preheating furnace are arranged in parallel with each other in the front stage of a melting furnace in which iron scrap is melted, and preheated iron scrap is charged from both preheating furnaces into the melting furnace. A damper is provided between the shaft type preheating furnace and the melting furnace, so that exhaust gas discharged from the melting furnace is prevented from directly flowing into the shaft type preheating furnace and introduced into the rotary kiln type preheating furnace. Exhaust gas which has passed through the rotary kiln type preheating furnace is introduced into the shaft type preheating furnace preferably from an upper portion and discharged from a lower portion. The rotary kiln type preheating furnace and/or the shaft type preheating furnace includes an air or oxygen gas introducing port used for burning components contained in the exhaust gas.

11 Claims, 4 Drawing Sheets

IRON-BASE SCRAP PREHEATING APPARATUS AND METHOD

FIELD OF THE INVENTION

The present invention relates to a preheating apparatus for preheating iron scrap for recycling. Also, the present invention relates to a preheating process for preheating iron scrap in the preheating apparatus. Particularly, the present invention relates to a preheating apparatus for preheating iron scrap in which iron scrap is preheated in a rotary kiln type preheating furnace and a shaft furnace type preheating furnace, which are arranged in parallel with each other in the front stage of a melting furnace, and the thus preheated iron scrap is fed into the melting furnace and heated by means of arc heating or top-blowing oxygen so that the iron scrap can be melted in the furnace. Also, the present invention relates to a process for preheating iron scrap in the preheating apparatus.

BACKGROUND OF THE INVENTION

When steel is refined in an electric furnace or a converter, iron scrap to be fed into the furnace, which is a source of iron, is previously heated. In this preheating process, a large quantity of thermal energy is required. Therefore, from the viewpoint of operating cost, the preheating of iron scrap does not show much merit to reduce the cost and, further, the equipment cost is increased to provide the preheating apparatus. Recently, from the viewpoint of recycling the resource, the recycling of iron scrap has become important. In order to conduct recycling iron scrap effectively, in order to use iron scrap effectively from the viewpoint of putting it into practical use as an iron source and in order to save energy when iron scrap is used, it has been desired to develop a preheating technique for preheating iron scrap by which the total quantity of energy required for refining can be reduced as much as possible and the production cost can be reduced.

The prior art in this technical field of melting iron scrap was disclosed in "Strategy for Electric Furnace for Common Steel", which was published in November of 1994, in "Electric Furnace" issued by The Iron and Steel Institute of Japan and presented in the Twenty-seventh and Twenty-eighth Shiraishi Memorial Lectures. According to the above prior art, when iron scrap is melted, it requires a large electric power consumption, so that the operation cost is raised. According to the description of the above prior art, a cause of increase in the operation cost is a deterioration in the thermal efficiency after the step of flat bath (at the time of melting down). Concerning the method of melting iron scrap in a converter type furnace, there is a report on page 520 in vol. 78 (1992) in "Iron and Steel" (issued by the Iron and Steel Institute of Japan). According to the report, the equipment cost is increased to process a large quantity of exhaust gas and, since iron scrap is refined into molten iron, it is necessary to provide a converter in the after-process. According to the U.S. Pat. No. 4,852,858, there is disclosed a method of preheating material by the exhaust gas discharged from a refining furnace when a shaft-shaped material accommodating container is arranged in an upper portion of the metal refining furnace. However, according to the above technique, it is difficult to control the preheating condition constantly. Therefore, the refining condition tends to fluctuate greatly. As a result, it is difficult to stabilize the product quality. Japanese Examined Patent Publication (Kokoku) No. 6-46145 discloses another shaft-type preheating furnace. According to this shaft-type preheating furnace, although the thermal efficiency is high, a lower portion of the furnace is exposed to gas of high temperature. Accordingly, pieces of iron scrap are fused to each other. Therefore, it is necessary to cut off the pieces of iron scrap, which have been fused to each other, by means of oxygen cutting. Further, the following are disclosed. When water-cooled grates are provided, the charging ratio is lowered in order to ensure a space in which the water-cooled grates are operated. Therefore, the thermal efficiency is deteriorated.

Concerning the rotary kiln used for preheating iron scrap, Japanese Unexamined Patent Publication (Kokai) No. 6-228662 discloses that it is difficult for pieces of iron scrap to be fused to each other since the rotary kiln is always rotated so as to move the pieces of iron scrap in it, however, the charging ratio of iron scrap is low, so that the thermal efficiency is deteriorated. Usually, iron scrap not containing organic material is heated in the above rotary kiln for preheating iron scrap. Therefore, it is necessary to conduct a previous treatment of iron scrap (classification). As a result, the production cost is increased.

Since the above rotary kiln is always rotated so that iron scrap can be oscillated in it, it is possible to introduce gas at a relatively high temperature into the rotary kiln while avoiding the fusion of pieces of iron scrap. With respect to exhaust gas containing combustible components such as CO and $H_2$, it is possible to change the latent heat into the sensible heat by introducing air or oxygen so that the combustible components can be burned. However, since the charging ratio of iron scrap in the furnace is low, the heat exchanging effectiveness is 30 to 40% at most, which is low. This low heat exchanging effectiveness is the biggest problem. Further, when large and rough pieces of iron scrap and heavy pieces of iron scrap are charged into the rotary kiln type preheating furnace, there is a possibility that the inside refractories of the preheating furnace are damaged.

On the other hand, when the shaft furnace type preheating furnace is used, it is possible to accomplish a high heat exchanging effectiveness because iron scrap is charged into the preheating furnace and heat exchange is conducted between iron scrap and exhaust gas. However, in accordance with a decrease in gas temperature, the heat exchanging effectiveness is deteriorated. Accordingly, the heat exchanging effectiveness is actually about 70% at most. When small pieces of iron scrap are exposed to gas of high temperature in the furnace bottom, they are heated to temperatures not lower than 800° C., so that the pieces of iron scrap are fused to each other or spaces formed between the pieces of iron scrap are filled with dust. As a result, the pressure loss is increased. In an example, in order to avoid the fusion of pieces of iron scrap, water-cooled grates are provided, and the pieces of iron scrap are put on the grates and preheated. However, in the above example, in order to ensure the operating space in which the grates are operated, the fusing ratio of iron scrap in the furnace is decreased, and the heat exchanging effectiveness is lowered. In order to solve the above problems, Japanese Unexamined Patent Publication (Kokai) No. 7-180975 discloses an example in which piece of iron scrap, the sizes of which are so small that they may be fused to each other when they are preheated, are charged into an arc furnace from an exclusive charging port without being preheated so that the occurrence of fusion can be prevented. However, this example causes a problem that a portion of iron scrap is charged into the furnace without being preheated.

SUMMARY OF THE INVENTION

As described above, the rotary kiln type preheating furnace and the shaft type preheating furnace have both merits and demerits. Therefore, it is an object of the present invention to provide a preheating apparatus for preheating iron scrap effectively in which the merits can be enhanced and the demerits can be reduced, that is, it is an object of the present invention to provide a preheating apparatus for effectively preheating pieces of iron scrap of various sizes and shapes while the fusion of the pieces of iron scrap is avoided. Also, it is an object of the present invention to provide a preheating method for preheating iron scrap in the preheating furnace.

The present invention provides a preheating apparatus for preheating iron scrap before melting it in a melting furnace, characterized in that: a rotary kiln type preheating furnace and a shaft type preheating furnace are arranged in parallel with each other in the front stage of the melting furnace; iron scrap preheated by and sent from both preheating furnaces is charged into the melting furnace; a damper is arranged between the shaft type preheating furnace and the melting furnace so that exhaust gas sent from the melting furnace can be prevented from directly entering the shaft type preheating furnace, that is, exhaust gas sent from the melting furnace can be introduced into the rotary kiln type preheating furnace; and exhaust gas, which has passed through the rotary kiln type preheating furnace, is introduced into the shaft type preheating furnace. It is preferable to adopt an arrangement in which exhaust gas that has passed through the rotary kiln type preheating furnace is introduced into the shaft type preheating furnace from an upper portion of the shaft type preheating furnace and discharged from a lower portion. It is preferable to provide an air or oxygen gas introducing port for burning combustible components contained in the exhaust gas in the rotary kiln type preheating furnace and/or the shaft type preheating furnace. It is possible to provide a pusher type delivery mechanism or a grate opening and closing type delivery mechanism in the shaft type preheating furnace.

Also, the present invention provides a preheating method for preheating scrap iron before it is melted in a melting furnace, characterized in that: iron scrap is preheated in both the rotary kiln type preheating furnace and the shaft type preheating furnace; the thus preheated iron scrap is charged into the melting furnace; exhaust gas sent from the melting furnace is prevented from directly flowing into the shaft type preheating furnace; exhaust gas sent from the melting furnace is introduced into the rotary kiln type preheating furnace; and exhaust gas that has passed through the rotary kiln type preheating furnace is introduced into the shaft type preheating furnace. It is preferable that exhaust gas passing through the rotary kiln type preheating furnace is introduced into the shaft type preheating furnace from an upper portion of the shaft type preheating furnace and discharged from a lower portion. It is preferable that air or oxygen gas is introduced into the rotary kiln type preheating furnace and/or the shaft type preheating furnace so that combustible components contained in the exhaust gas can be burned to convert the latent heat of the exhaust gas into sensible heat.

BEST MODE FOR CARRYING OUT THE INVENTION

Figure 1:
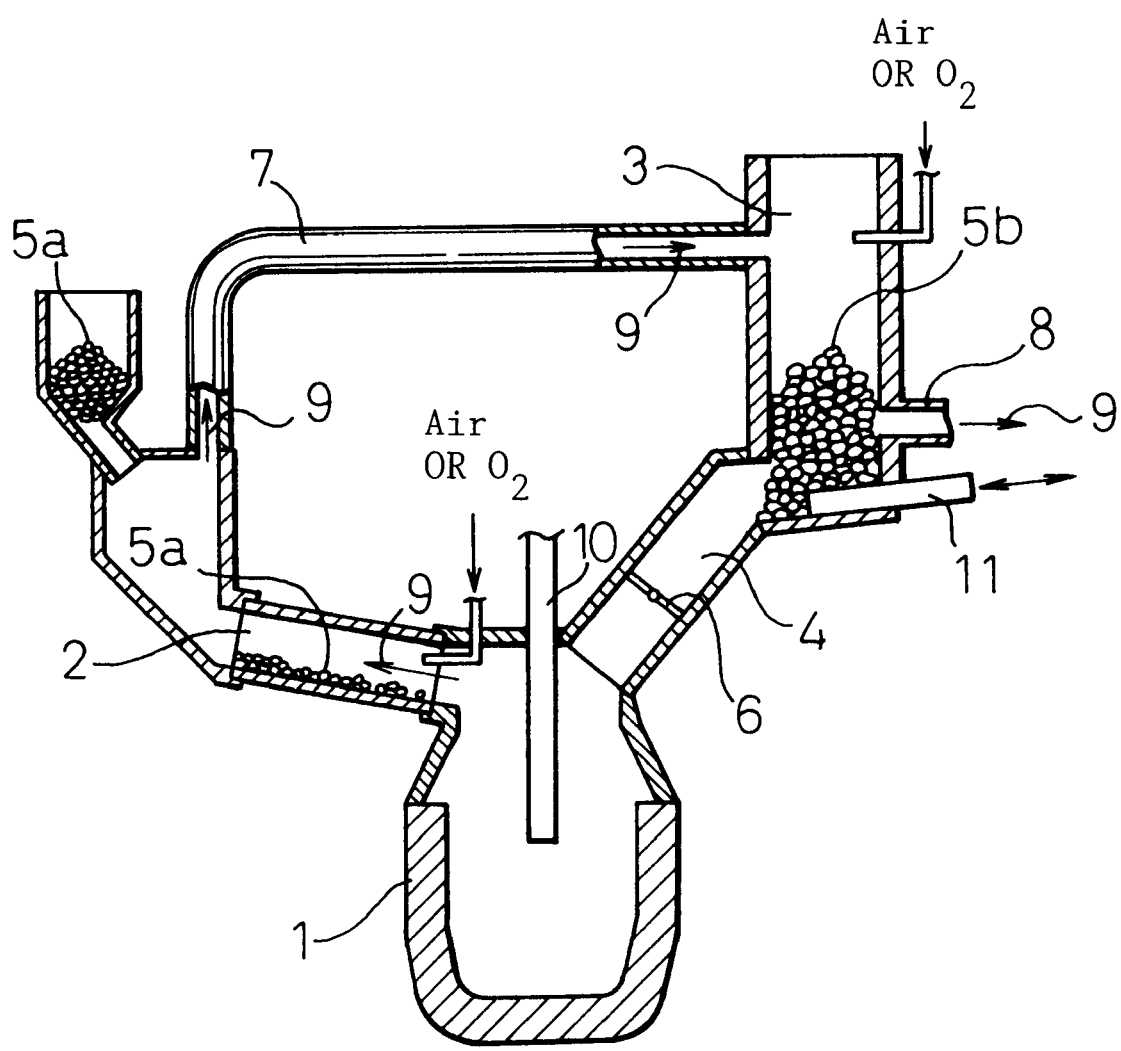
FIG. 1 is a schematic illustration showing an example of the preheating apparatus for iron scrap of the present invention.

The features and the reasons for limitation of the present invention will be described in detail below.

According to the present invention, there are provided a rotary kiln type preheating furnace and a shaft type preheating furnace which are arranged in parallel with each other in the front stage of a melting furnace. As described before, when pieces of iron scrap, the sizes of which are large, are charged into the rotary kiln type preheating furnace, there is a possibility that the inside refractories of the furnace are damaged. However, when the pieces of iron scrap, the sizes of which are large, are charged into the shaft type preheating furnace, it is possible to provide a good ventilation and the charged pieces of iron scrap, the sizes of which are large, are difficult to be fused to each other. On the other hand, when pieces of iron scrap, the sizes of which are small, are charged into the shaft type preheating furnace, it is impossible to provide a good ventilation and further there is a possibility that the charged pieces of iron scrap are fused to each other. However, when the pieces of iron scrap, the sizes of which are small, are charged into the rotary kiln type preheating furnace, there is no possibility that the inside refractories are damaged, and further when they are oscillated in the rotary kiln type preheating furnace at all times, they can be appropriately preheated. Accordingly, when the rotary kiln type preheating furnace and the shaft type preheating furnace are arranged in parallel with each other in the front stage of the melting furnace like the arrangement prescribed by the present invention, it is possible to select the most appropriate preheating furnace in accordance with the characteristics such as a size and shape of iron scrap. Therefore, it is possible to avoid the occurrence of a problem caused when only one of the furnaces is used for preheating.

Concerning the exhaust gas discharged from the melting furnace, a damper is provided between the shaft type preheating furnace and the melting furnace, so that the exhaust gas discharged from the melting furnace can be prevented from directly flowing into the shaft type preheating furnace and introduced into the rotary kiln type preheating furnace. When exhaust gas sent from the melting furnace of high temperature is directly introduced into the shaft type preheating furnace, iron scrap in the bottom of the shaft type preheating furnace is heated to temperatures not lower than 800° C. as described before, and there is a possibility that pieces of iron scrap are fused to each other. For the above reasons, in order to prevent the exhaust gas from flowing into the shaft type preheating furnace, the damper is provided. On the other hand, in the rotary kiln type preheating furnace, since it is rotated at all times, there is no possibility that the pieces of iron scrap are fused to each other. Further, in the rotary kiln type preheating furnace, a disadvantage of the rotary kiln type preheating furnace that the heat exchanging ratio is low, to be specific, the heat exchanging ratio is 30 to 40%, can be compensated by directly introducing the exhaust gas of high temperature into the rotary kiln type preheating furnace, and it becomes possible to preheat iron scrap to high temperatures.

After the exhaust gas has passed through the rotary kiln type preheating furnace, it is introduced into the shaft type preheating furnace. Due to the foregoing, since the temperature of exhaust gas is lowered when it preheated iron scrap in the rotary kiln type preheating furnace, even if it is introduced into the shaft type preheating furnace, the problem of fusion of iron scrap is seldom caused. Since the heat exchanging ratio of the shaft type preheating furnace is high, even if the exhaust gas of low temperature is used, it is possible to heat iron scrap in the shaft type preheating furnace to a sufficiently high temperature.

Concerning the method of introducing exhaust gas into the shaft type preheating furnace, it is common to introduce exhaust gas into the furnace bottom of the shaft type preheating furnace and discharge it from the furnace top. However, it is advantage that exhaust gas is introduced from an upper portion of the shaft type preheating furnace and discharged from a lower portion, because iron scrap in the furnace bottom portion is not heated to an extremely high temperature and an increase in pressure loss caused by fusion of iron scrap and clogging of dust can be positively prevented. That is, in the case of a counter flow in which exhaust gas is introduced into the furnace bottom and discharged from the furnace top, iron scrap in the furnace bottom portion is heated to an extremely high temperature and there is an increasing possibility of fusion of iron scrap. Further, dust contained in the exhaust gas tends to accumulate in the furnace bottom which is an introducing section for exhaust gas from which exhaust gas is introduced into the charged layer in the preheating furnace. Therefore, a pressure loss tends to increase. On the other hand, when exhaust gas is introduced from an upper portion of the shaft type preheating furnace, exhaust gas of high temperature comes into contact with iron scrap of low temperature, and then heat exchanging is conducted under the condition of a concurrent flow. Therefore, iron scrap is not heated to an extremely high temperature. Further, a position at which dust tends to accumulate is different from a position at which iron scrap is heated to the maximum temperature. Therefore, an increase in pressure loss caused by fusion of iron scrap and clogging of dust can be positively prevented.

When an air introducing port is provided in the rotary kiln type preheating furnace or the shaft type preheating furnace, the following advantages can be provided. In the case where iron scrap cannot be preheated to a sufficiently high temperature only by sensible heat contained in exhaust gas, air or oxygen gas is introduced from this air introducing port, so that combustible components contained in the exhaust gas such as CO and $H_2$ can be burned. In this way, latent heat in the exhaust gas is converted into sensible heat, so that the combustible components contained in the exhaust gas can be effectively utilized. Especially, in the rotary kiln type preheating furnace, it is possible to preheat iron scrap to a temperature of 1200° C. without causing the fusion of iron scrap. Accordingly, the above means is effective.

Secondary combustion conducted in the preheating furnace will be further explained below.

When a large quantity of combustible gas, such as CO, $H_2$ and so forth, is contained in the exhaust gas discharged from the melting furnace, all of combustible gas or a portion of combustible gas is burned in the preheating furnace. Due to the foregoing, not only sensible heat in the exhaust gas but also latent heat can be effectively utilized for preheating iron scrap. It is preferable that the introducing position at which air of oxygen gas is introduced is located close to the gas introducing position of the rotary kiln at which the combustion space can be ensured. In the case of multistage combustion, the shaft type preheating furnace is effective.

It is preferable that a quantity of gas to be burned is determined when consideration is given to the following.

Temperatures on the surface of the refractories of the rotary kiln and temperatures on the shell are maintained in an allowable range.

For example, temperatures on the surface of the refractories $\leq 1300°$ C., and temperatures on the shell $\leq 300°$ C.

After preheating, scrap is not fused or melted by oxidation.

For example, temperatures of iron scrap at the exit of the rotary kiln $\leq 1200°$ C., and temperatures of iron scrap at the exit of the shaft furnace are $\leq 800°$ C.

A quantity of exhaust gas after the completion of combustion does not exceed a gas discharging capacity.

In the case where it is impossible to conduct complete combustion due to the above limitation of combustion, air or oxygen gas is introduced again after combustion gas has passed through the rotary kiln, and it become possible to utilize the latent heat more effectively.

Figure 3:
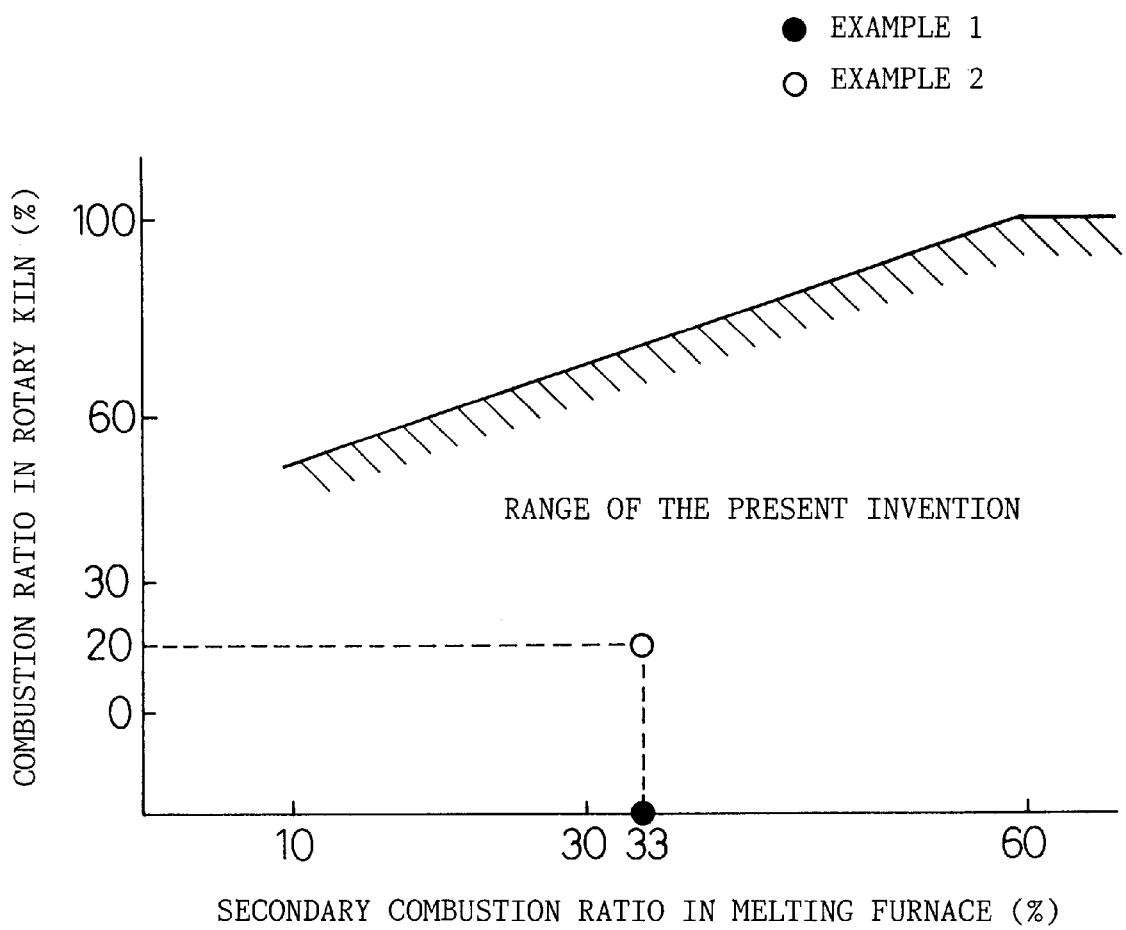
FIG. 3 is a graph showing a relationship between the secondary combustion ratio of exhaust gas in the furnace of the present invention and the combustion ratio of exhaust gas in the rotary kiln type furnace.

In FIG. 3, there is shown a graph for explaining the secondary combustion of exhaust gas. On this graph, the horizontal axis represents a secondary combustion rate in the melting furnace, and the vertical axis represents a combustion rate in the rotary kiln. In this case, (secondary combustion ratio in the furnace)=(concentration of $CO_2$ in exhaust gas)/(concentration of $CO+CO_2$ in exhaust gas), and (combustion rate in the rotary kiln)=(quantity of CO gas burned in the rotary kiln)/(quantity of CO gas contained in exhaust gas introduced into the rotary kiln). Further, a point at which the theoretical combustion temperature of exhaust gas in the rotary kiln exceeds 1800° C. (in the case of complete combustion) is defined as a limit of combustion in the rotary kiln, and a solid line on the graph is determined. From the knowledge of the present inventors, the following were found. The most appropriate region of the secondary combustion ratio in the furnace is about 10% to 60%. With respect to that, it is possible to increase the combustion ratio in the rotary kiln to about 50% to 100%. In this region, the present invention can provide a sufficiently high effect. That is, a preferable combustion ratio of exhaust gas of the present invention is shown in a region of the hatched line on the graph.

Referring to the accompanying drawings, the present invention will be further described in detail below.

Figure 2:
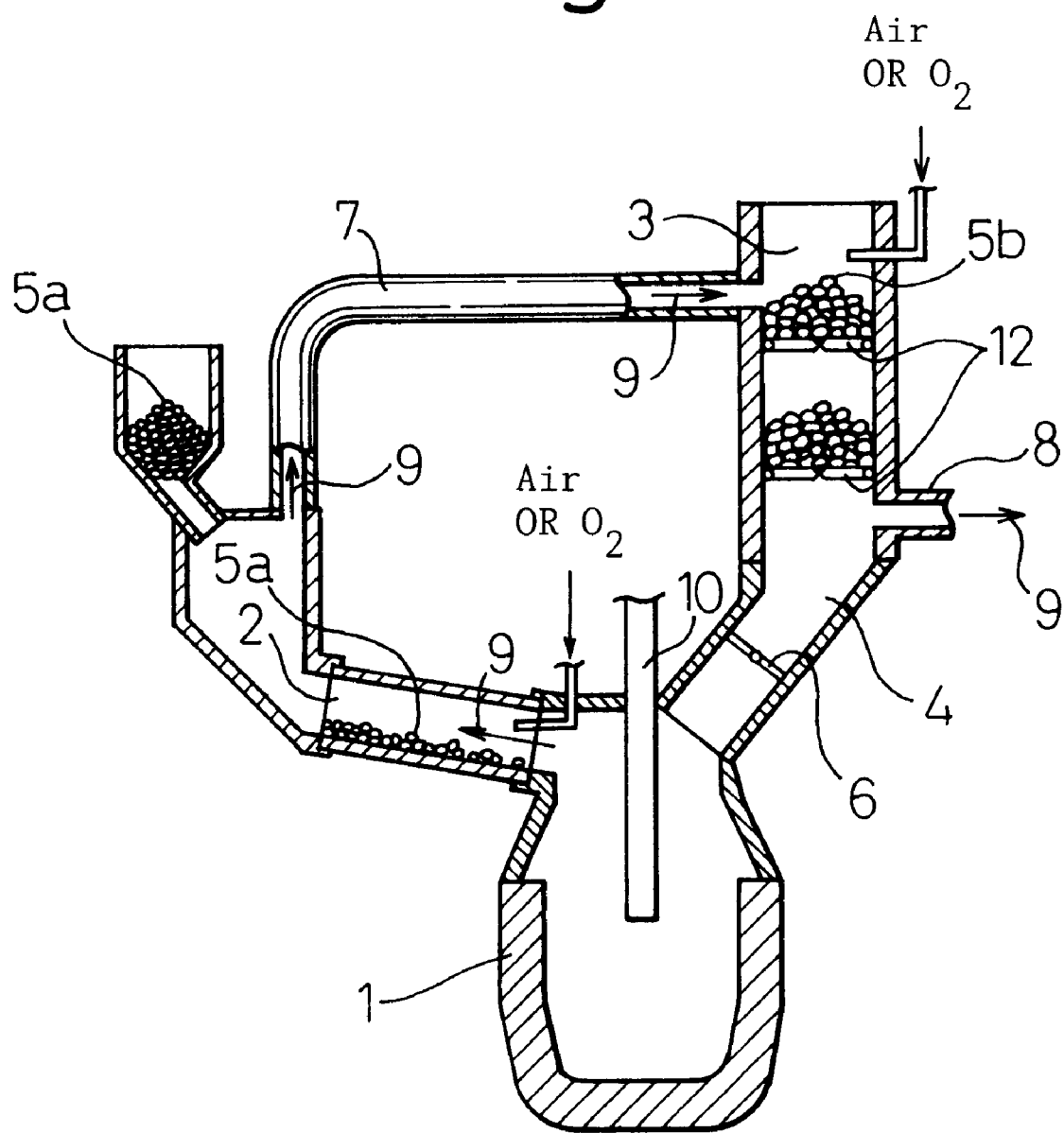
FIG. 2 is a schematic illustration showing another example of the preheating apparatus for iron scrap of the present invention.

Examples of the preheating apparatus for iron scrap of the present invention are shown in FIGS. 1 and 2. FIG. 1 shows an example in which a pusher type delivery mechanism 11 is provided in the shaft type preheating furnace 3, wherein the pusher type delivery mechanism 11 pushes iron scrap in the furnace bottom so that it can be charged into the melting furnace 1. FIG. 2 shows an example in which a grate opening and closing type delivery mechanism 12 is provided in the shaft type preheating furnace 3, wherein iron scrap is loaded and preheated on the grate opening and closing type delivery mechanism 12, which is successively opened and closed so as to charge iron scrap into the melting furnace 1. In this example, a space is formed between a plurality of grate opening and closing type delivery mechanisms 12.

Pieces of shredder scrap 5a, the sizes of which are not more than 300 mm, which are inappropriate to be charged into the shaft type preheating furnace 3, are charged into the rotary kiln type preheating furnace 2 from an upper portion, and pieces of scrap, the sizes of which are not less than 300 mm, which can ensure ventilation after they have been charged, are charged into the shaft type preheating furnace 3 from the furnace top. Concerning the scrap delivery rate to the melting furnace 1 is determined as follows. (rotary kiln type preheating furnace):(shaft type preheating furnace)=

4:6. Iron scrap is continuously charged into the melting furnace from the rotary kiln type preheating furnace. From the shaft type preheating furnace 3, iron scrap is charged into the melting furnace in batches or semicontinuously.

In the present invention, iron scrap is classified, for example, into scrap A and scrap B. Scrap A is suitable for the rotary kiln type preheating furnace, and pieces of scrap A are composed of thin pieces, the average size of which is not larger than 300 mm and the thickness of which is not more than 3 mm, or alternatively pieces of scrap A are composed of small spherical pieces. Specific examples of scrap A are shredder scrap, short shavings and can scrap. When this scrap A is charged and packed into the shaft type preheating furnace, the percentage of voids is lowered, and the ventilation in the furnace is deteriorated. When pieces of scrap A are thin, they are oxidized and heated, and pieces of scrap A tend to be fused with each other. However, in the rotary kiln type preheating furnace, pieces of scrap A are oscillated at all times. Accordingly, the occurrence of fusion of the pieces of scrap A can be avoided.

Scrap B is suitable for the shaft type preheating furnace, and pieces of scrap B are composed of relatively thick pieces, the average size of which is not smaller than 300 mm. Examples of scrap B are crop scrap, heavy scrap and press scrap. When these pieces of scrap B are charged into the rotary kiln, there is caused a problem in which the inside refractories of the rotary kiln are damaged. However, when these pieces of scrap B are charged into the shaft type furnace, no problems are caused in the ventilation in the furnace and the fusion of iron scrap.

The damper 6 is arranged in the oblique portion 4 located in a lower portion of the shaft type preheating furnace 3. Only when pieces of scrap 5b in the shaft type preheating furnace 3 are delivered by the pusher type delivery mechanism 11 shown in FIG. 1 or the grate type opening and closing delivery mechanism 12 shown in FIG. 2, is the damper 6 opened. In other cases, the damper 6 is closed. Exhaust gas 9 in the melting furnace 1 is introduced into the rotary kiln type preheating furnace 2, and shredder scrap 5a is preheated by the exhaust gas 9 while the rotary kiln type preheating furnace 2 is being rotated. At this time, if necessary air is introduced, and CO or $H_2$ contained in the exhaust gas 9 is burned while the target temperature of 1200° C. is maintained at which the pieces of shredder scrap 5a are not fused to each other.

Exhaust gas 9 discharged from the rotary kiln type preheating furnace 2 is sent to the shaft type preheating furnace 3 via the exhaust gas conduit tube 7 and introduced into the shaft type preheating furnace 3 from an upper portion. After that, exhaust gas 9 is discharged from the discharge port 8. In this way, iron scrap 5b in the shaft furnace type preheating furnace 3 can be uniformly preheated by the exhaust gas 9.

Since the shaft type preheating furnace 3 is packed with iron scrap 5b, it is necessary to control the preheating temperature to be not higher than 800° C. so that the pieces of iron scrap cannot be fused to each other. Therefore, when the temperature in the furnace exceeds 800° C., the height of the layer of packed scrap 5b is adjusted, or the quantity of air or oxygen gas introduced into the rotary kiln type preheating furnace 2 is adjusted, so that the preheating temperature can be controlled to be not higher than 800° C. On the contrary, when the exhaust gas temperature is too low, air or oxygen gas is also introduced into the shaft type preheating furnace 3, and CO or $H_2$ contained in the exhaust gas 9 is burned so that the preheating temperature can be raised.

When the above series of operation is conducted, shredder scrap, which is not suitable for the shaft type preheating furnace, and heavy scrap, which is not suitable for the rotary kiln type preheating furnace, can be effectively preheated to a temperature of limit at which the iron scrap starts fusing.

Next, examples of the present invention will be explained below.

EXAMPLES

When iron scrap, at 20 t/hr, was melted in a melting furnace from which exhaust gas of 4000 $Nm^3$/hr was generated, the temperature of which was 1000° C. and the exhaust gas composition of which was CO: 60 volume %, $CO_2$: 30 volume % and $N_2$: 10 volume %, a rotary kiln type preheating furnace, the preheating efficiency of which was 30%, and a shaft type preheating furnace, the preheating efficiency of which was 50%, were used, and iron scrap was preheated under the following operating conditions. In this case, the preheating efficiency is defined as a ratio of a quantity of heat transmitted to iron scrap, to a quantity of sensible heat of the introduced exhaust gas.

Example 1

The rotary kiln type preheating furnace and the shaft type preheating furnace were arranged in parallel with each other, and exhaust gas generated by the melting furnace was introduced into the shaft type preheating furnace after it has passed through the rotary kiln type preheating furnace, so that iron scrap could be preheated. Concerning iron scrap, iron scrap A was continuously fed to the rotary kiln type preheating furnace by 10 t/h, and also iron scrap B was continuously fed to the shaft type preheating furnace by 10 t/h. In this case, scrap A and B were fed to the preheating furnaces independently from each other. As a result, scrap A was preheated to 393° C., and scrap B was preheated to 447° C., that is, the temperatures of scrap were raised higher than those of Comparative Examples 1 and 2 described later.

Example 2

In this example, scrap was preheated as follows. In the rotary kiln type preheating furnace, 20% of CO gas contained in the exhaust gas was burned by feeding air or oxygen gas. Other conditions of this example were the same as those of Example 1. As a result, the scrap preheating temperature was further raised, that is, scrap A was preheated to 645° C., and scrap B was preheated to 717° C.

Comparative Example 1

Only the rotary kiln type preheating furnace was used, and scrap A of 20 t/hr was fed to the rotary kiln type preheating furnace and preheated by the exhaust gas under the same condition. All scrap was preheated to 208° C.

Comparative Example 2

Only the shaft type preheating furnace was used, and scrap B of 20 t/hr was fed to the shaft type preheating furnace and preheated by the exhaust gas under the same condition. All scrap was preheated to 329° C.

Figure 4:
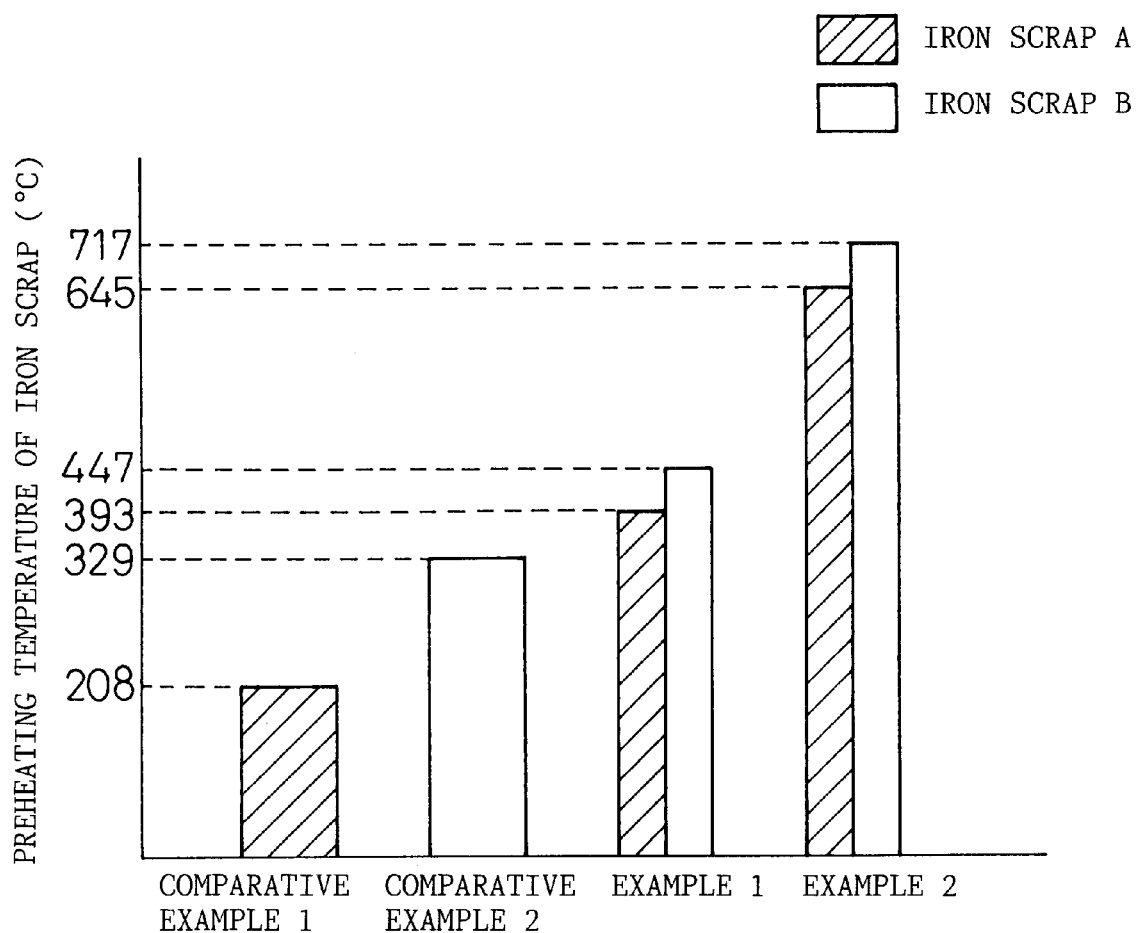
FIG. 4 is a graph showing preheating temperatures of the example of the present invention and those of the comparative examples.

With respect to the above examples, a relation between the combustion ratio in the melting furnace and the combustion ratio in the rotary kiln is shown, and results of scrap preheating temperatures of the examples and the comparative examples are shown in FIG. 4. As can be seen in FIG. 4, in Example 2, the scrap temperatures were high, and preheating was conducted effectively even when the combustion ratio in the rotary kiln was 20%. Even in Example 1 in which no exhaust gas was burned in the rotary kiln, the efficiency in the example, in which the rotary kiln type preheating furnace and shaft type preheating furnace were arranged in parallel with each other, was remarkably enhanced as compared with the efficiency in the comparative example in which preheating was conducted by only one preheating furnace.

INDUSTRIAL APPLICABILITY

According to the present invention, the shaft type preheating furnace and the rotary kiln type preheating furnace are arranged in parallel with each other. Therefore, the respective preheating furnaces can be fed with iron scrap independently from each other. Further, the apparatus of the invention is provided with an air or oxygen gas introducing port, so that the combustion ratio of exhaust gas in each preheating furnace can be adjusted. Accordingly, it is possible to conduct preheating highly effectively while the fusion of iron scrap of various types, sizes and shapes is avoided.

What is claimed is:

1. An apparatus for preheating and melting iron scrap for recycling comprising: a melting furnace for melting the iron scrap and generating an exhaust gas; a preheating device connected to said melting furnace for preheating said iron scrap with said exhaust gas; an exhaust gas treating device connected to said preheating device for treating exhaust gas which has been used for preheating, wherein said preheating device comprises a rotary kiln preheating furnace and shaft preheating furnace, arranged in parallel with each other, connected to first and second openings in said melting furnace and connected to each other; and wherein exhaust gas is discharged from said melting furnace through said first opening into said rotary kiln preheating furnace; exhaust gas discharged from the rotary kiln preheating furnace is introduced into the shaft preheating furnace; and iron scrap is independently charged into and preheated by the rotary kiln preheating furnace and the shaft preheating furnace and then fed into the melting furnace.

2. An apparatus for preheating iron scrap according to claim 1, wherein a damper is arranged in said second opening between the shaft preheating furnace and the melting furnace, and exhaust gas discharged from the melting furnace is prevented from directly flowing into the shaft preheating furnace.

3. An apparatus for preheating iron scrap according to claim 1, wherein exhaust gas which has passed through the rotary kiln preheating furnace is introduced into the shaft preheating furnace from an upper portion and discharged from a lower portion.

4. An apparatus for preheating iron scrap according to any one of claims 1, wherein the shaft preheating furnace includes a pusher type delivery mechanism.

5. An apparatus for preheating iron scrap according to claim 1, wherein the shaft preheating furnace includes a grate opening and closing type delivery mechanism.

6. An apparatus for preheating and melting iron scrap for recycling comprising: a melting furnace for melting the iron scrap and generating an exhaust gas; a preheating device connected said melting furnace for preheating said iron scrap with said exhaust gas; an exhaust gas treating device connected to said preheating device for treating exhaust gas which has been used for preheating; wherein said preheating device comprises a rotary kiln preheating furnace and a shaft preheating furnace, arranged in parallel with each other, connected to first and second openings in said melting furnace and connected to each other; and wherein exhaust gas is discharged from said melting furnace through said first opening into said rotary kiln preheating furnace; exhaust gas discharged from the rotary kiln preheating furnace is introduced into the shaft preheating furnace; and at least one of the rotary kiln preheating furnace and the shaft preheating furnace is provided with an air or oxygen gas introducing port used for burning combustible components contained in exhaust gas so that a combustion ratio in each preheating furnace can be adjusted.

7. A process for preheating and melting iron scrap in which iron scrap is preheated before it is melted in a melting furnace, comprising the steps of: charging iron scrap into both a rotary kiln preheating furnace and a shaft preheating furnace, which are arranged in parallel with each other in a front stage of the melting furnace; charging iron scrap from the rotary kiln preheating furnace and the shaft preheating furnace into the melting furnace, melting iron scrap, and generating exhaust gas in the melting furnace; preventing the exhaust gas, which has been discharged from the melting furnace, from directly flowing into the shaft preheating furnace; introducing the exhaust gas, which has been discharged from the melting furnace, into the rotary kiln preheating furnace; and introducing the exhaust gas, which has passed through the rotary kiln preheating furnace, into the shaft preheating furnace so as to preheat iron scrap.

8. The process for preheating iron scrap according to claim 7, wherein exhaust gas which has passed through the rotary kiln preheating furnace is introduced into the shaft preheating furnace from an upper portion and discharged from a lower portion.

9. A process for preheating iron scrap according to claim 7, wherein air or oxygen gas is introduced into at least one of the rotary kiln preheating furnace and the shaft preheating furnace so that combustible components contained in exhaust gas can be burned while a ratio of combustion in the each preheating furnace is controlled.

10. A process for preheating iron scrap according to any one of claim 7, wherein pieces of iron scrap, the average diameter of which is not more than 300 mm, are charged into the rotary kiln preheating furnace, and pieces of scrap iron, the average diameter of which is not less than 300 mm, are charged into the shaft preheating furnace so as to conduct preheating.

11. A process for preheating iron scrap according to any one of claim 7, wherein the preheating temperature in the rotary kiln preheating furnace is not higher than 1200° C., and the preheating temperature in the shaft preheating furnace is not higher than 800° C.

* * * * *